United States Patent [19]

David

[11] Patent Number: 5,595,671
[45] Date of Patent: Jan. 21, 1997

[54] WIRE FEEDER TORCH

[75] Inventor: David A. David, Tel Aviv, Israel

[73] Assignee: Planetics Welding Systems Ltd., Holon, Israel

[21] Appl. No.: 510,631

[22] Filed: Aug. 3, 1995

[51] Int. Cl.$^6$ .................................................. B23K 9/12
[52] U.S. Cl. ............................... 219/137.62; 219/137.71
[58] Field of Search ........................... 219/137.2, 137.63, 219/137.62, 137.9, 137.71

[56] References Cited

U.S. PATENT DOCUMENTS

| | | | |
|---|---|---|---|
| 4,510,373 | 4/1985 | Cox et al. | 219/137.71 |
| 4,608,482 | 8/1986 | Cox et al. | 219/137.71 |
| 4,845,336 | 7/1989 | Samokovliiski et al. | 219/137.2 |
| 5,338,917 | 8/1994 | Stuart et al. | 219/137.63 |

*Primary Examiner*—Clifford C. Shaw
*Attorney, Agent, or Firm*—Mark M. Friedman

[57] ABSTRACT

A torch wire feeder which includes a planetary feeder, an electrical motor and a handle. The feeder is characterized in that the electrical motor along with the planetary head is mounted to a back holder, and the goose-neck is mounted to a front holder, as the front and the back holders are assembled with the tubes for water-cooled and gas-cooled operation, as the back holder receives the wire from the conduit with holder thread nut. Furthermore, water tubes and a gas tube from the conduit are assembled to the back holder with a nut, and the front holder has distributor holes for gas and water cooling and also thread nut for transmitting the welding current, the water and the gas from the conduit to the neck, also contacting the holder to the thread nut with rubber seal, as all the parts are assembled to the handle with ergonomic form and also containing two potentiometers and start-stop switch and the hook, a all details and parts are included in ergonomic form body.

11 Claims, 7 Drawing Sheets

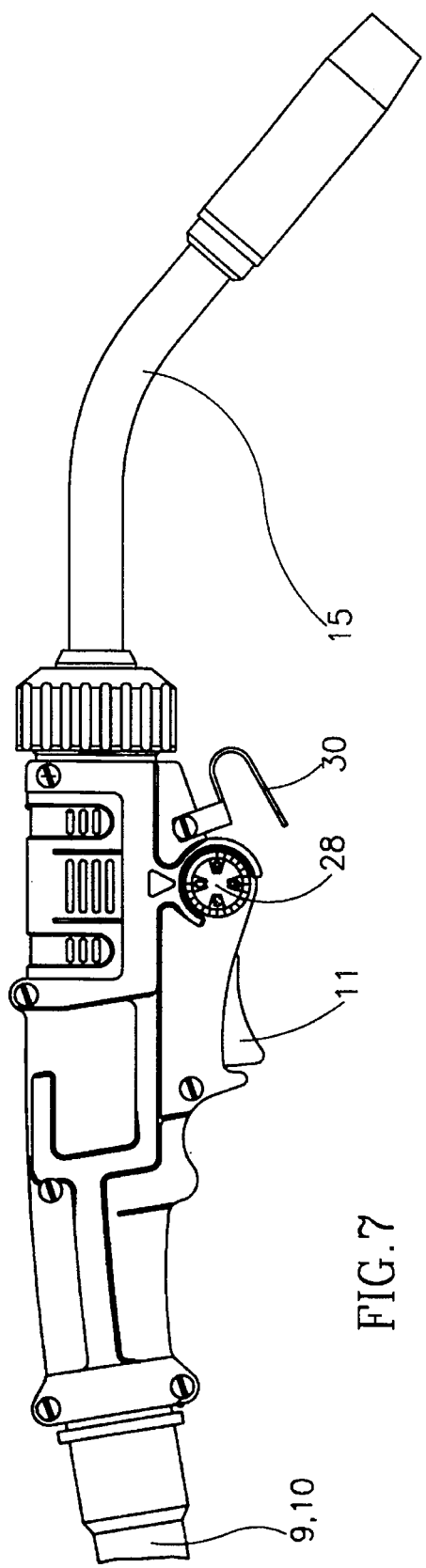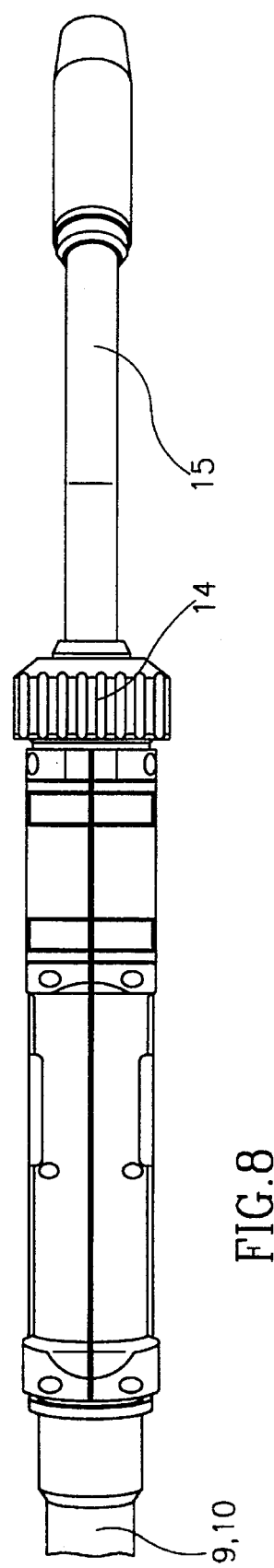
FIG.7
FIG.8

VIEW F

WIRE FEEDER TORCH

FIELD AND BACKGROUND OF THE INVENTION

The present invention is of a torch feeder including a handle for a MIG torch combined with a goose-neck MIG torch for both push-pulling and pulling applications in semi-automatic and robotic welding.

SUMMARY OF THE INVENTION

The torch wire feeder includes an electrical motor, planetary head, front and back holders, electrical conductivity tubes connecting the holders, goose-neck torch, gas and water conduits, switch for start-stop of the feeding, two potentiometers for speed and arc voltage regulation and handle including all the functions in detail inside and in ergonomic form of the outside, and also with 360° positioning of the neck. Two applications of this torch are possible: for water-cooled neck and conduits, and for gas cooled necks and conduits.

Most of the push-pulling torch feeders available on the market today are of pistol type design. This type of system causes fatigue to the welder and does not allow him to weld inside narrow spaces. The torch for push-pulling with goose-neck construction currently existing in the practice is designed for low welding current, without 360° positioning of the neck. Both existing systems are heavy in comparison with the normal MIG torch (MIG torch without wire feeder). All constructions existing at the moment do not have enough temperature capacity in the welding of aluminum with pure Argon gas. The big problem with the existing torch feeders is the non-ergonomic styling of the outside form of the handle caused by the large dimensions of the wire feeder component used in these feeders. All torch-type feeders currently existing in the practice, damage poor-quality wire then damages the contact tip and the spares for the torch.

The new invention is a goose-neck wire feeder torch with ergonomic form, with low weight, with quality wire feeding, without damage to wire, without excessive use of additional contact tips or spares, with high welding current and temperature resistance in pure Argon gas welding, with small dimensions compared with the regular MIG welding torch (MIG torch without wire feeder). For this purpose, the invention uses a planetary head with very small dimensions and a high feeding efficiency coefficient connected with an electrical motor with a hollow shaft. This motor is based in a special body with front and back holders. The back side of the motor is fixed to the back holder. The back holder also has holes for tubes, each hole having a tube for shielded gas and for cooling water. The same holder is fixed to the welding cable (water-or gas-cooled) and also is fixed to a gas tube for the shielded gas and water tubes for hot and cold water. The front holder has distributor holes for shielded gas, cooling water and a guide for wire received from the planetary head. On the front side of the front holder, is a format thread for transmitting the welding current and two cylindrical chambers for water distribution from the torch feeder to the neck. The neck may be water-cooled to 500 amperes welding current or gas-cooled to 400 amperes welding current. The neck is fixed to the front holder with a threaded nut in the thread of the front holder. This assembly allows for neck rotation of 360°. Between the front and the back holder is a connection tube assembly, two tubes for water cooling and one for shielded gas. These transmit the welding current between the welding conduit cable and the neck and also transmit water and gas from the conduit tubes to the neck. The welding wire is delivered from the wire guide tube in the conduit to the back holder and through the hole of the motor shaft and then through the planetary head receiving a linear motion for feeding the wire to the neck for welding. All the parts described above are contained in the body of the handle with ergonomic form and low weight. In addition, the body handle contains two potentiometer for speed and arc voltage control regulation and a switch for start-stop of the process.

This torch feeder has the following advantages:

low weight small dimensions, even when compared with standard MIG torch

360° neck rotation ergonomic form very light welding operation, without fatiguing the operator possibility of welding in narrow spaces universality for water-and gas-cooled applications suitable for heavy-duty welding with pure Argon gas protection

BRIEF DESCRIPTION OF THE DRAWINGS

The invention is herein described, by way of example only, with reference to the accompanying drawings, wherein:

The wire feeder torch is described in more detail in the figures as listed below:

FIG. 7 shows an ergonomic form from the side;

FIG. 8 shows an ergonomic form from the top;

DESCRIPTION OF THE PREFERRED EMBODIMENTS

Figure 1:
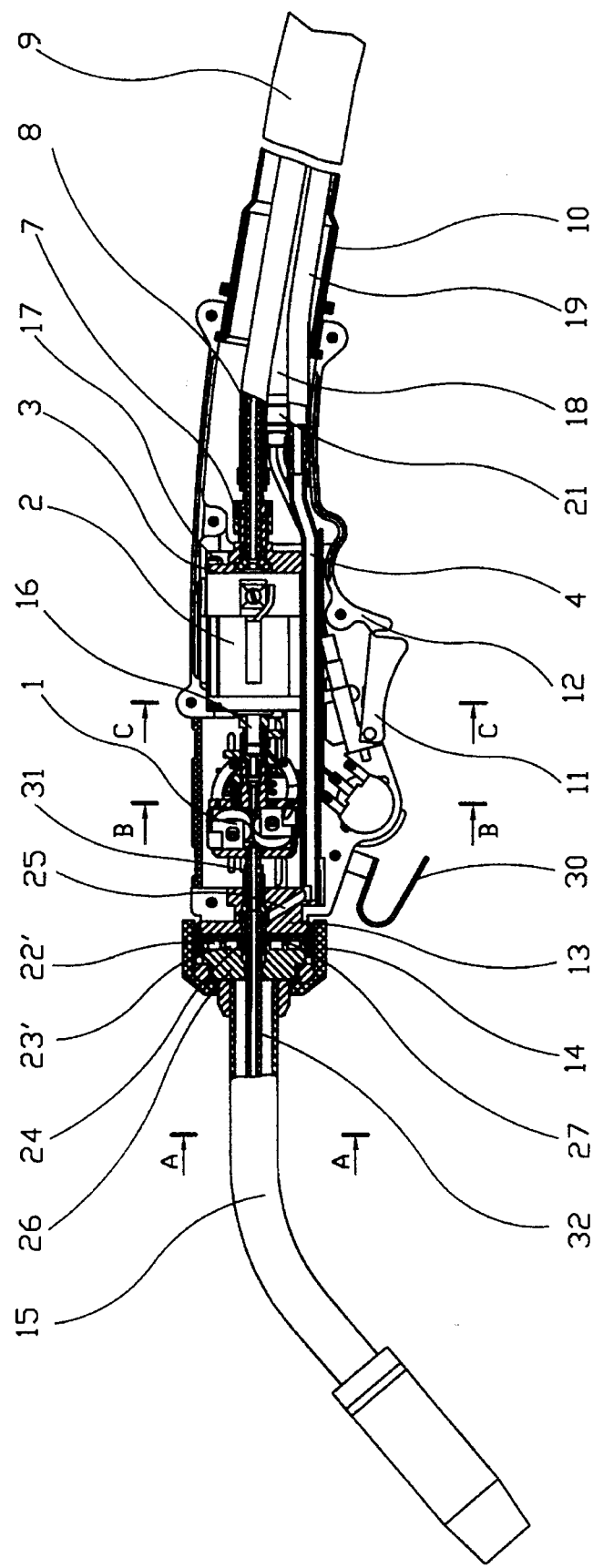
FIG. 1 is a cross section of the wire feeder torch with water-cooled function.
Figure 2:
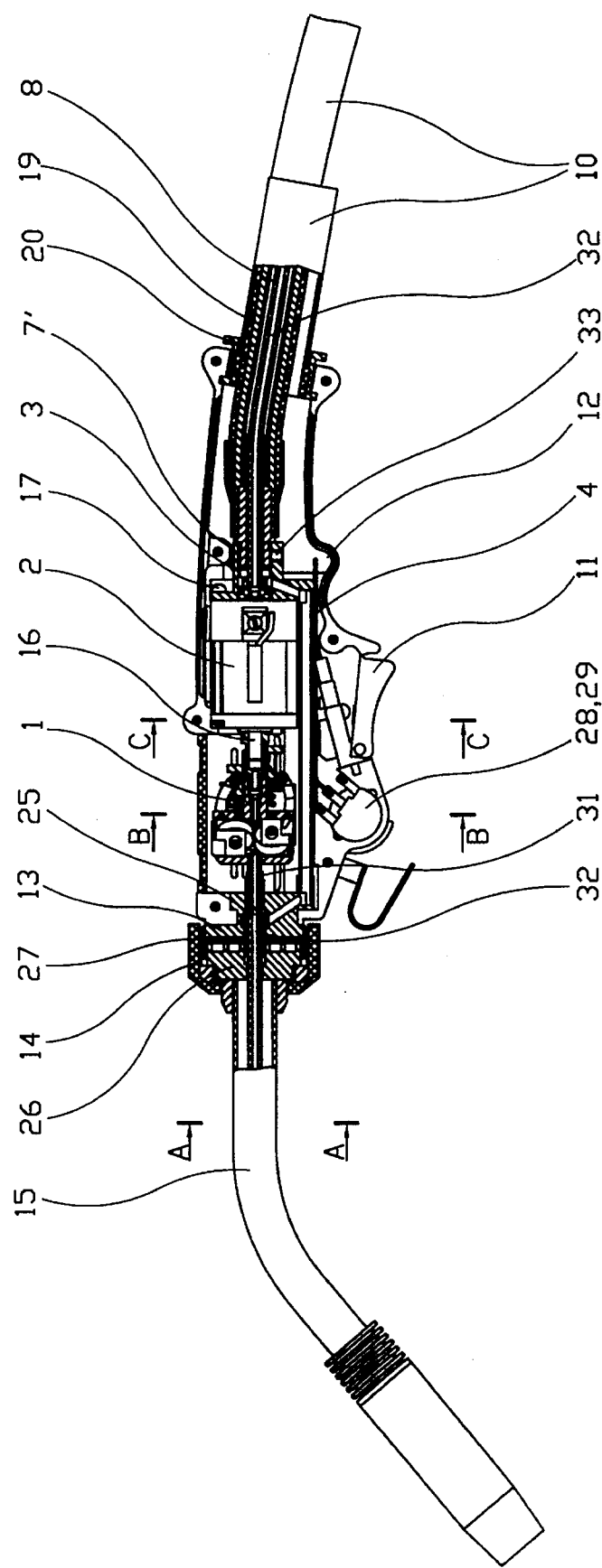
FIG. 2 is a cross section of wire feeder torch with gas-cooled function.
Figure 3:
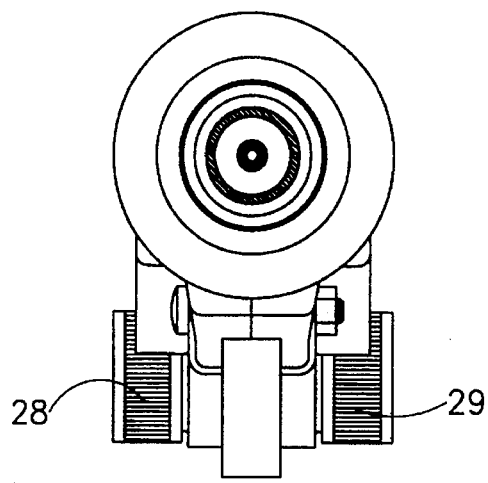
FIG. 3 shows section AA of FIGS. 1 and 2.
Figure 4:
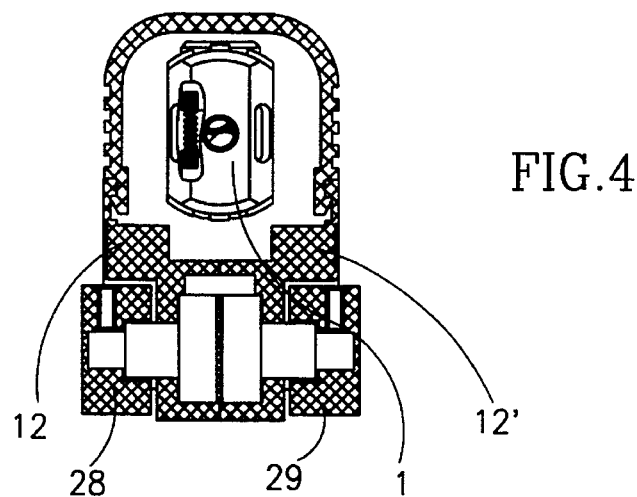
FIG. 4 shows section BB of FIGS. 1 and 2.
Figure 5:
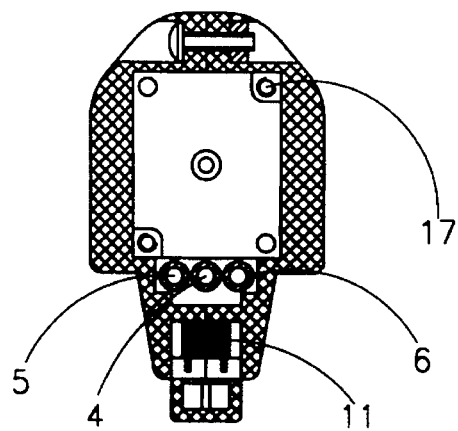
FIG. 5 shows section CC of FIGS. 1 and 2.
Figure 6:
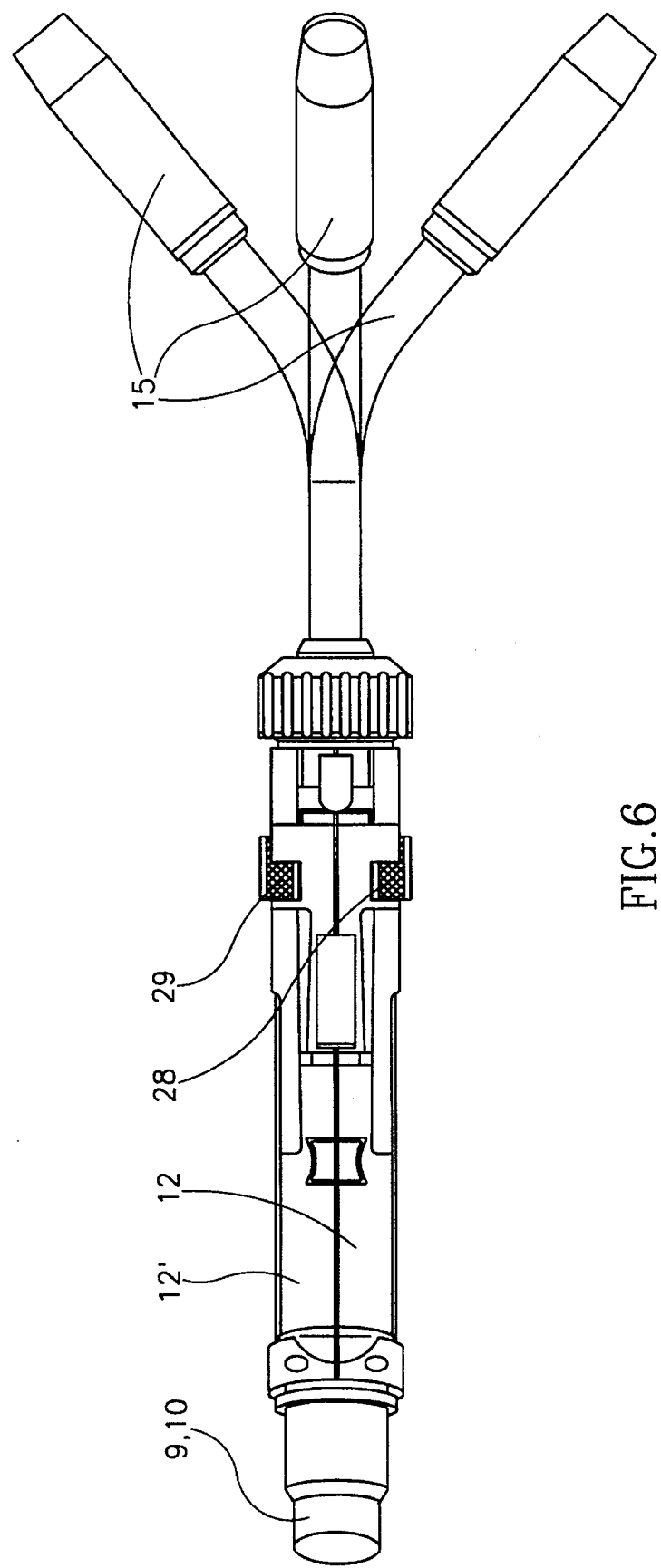
FIG. 6 shows an ergonomic form from the bottom with 360° neck rotation.
Figure 9:
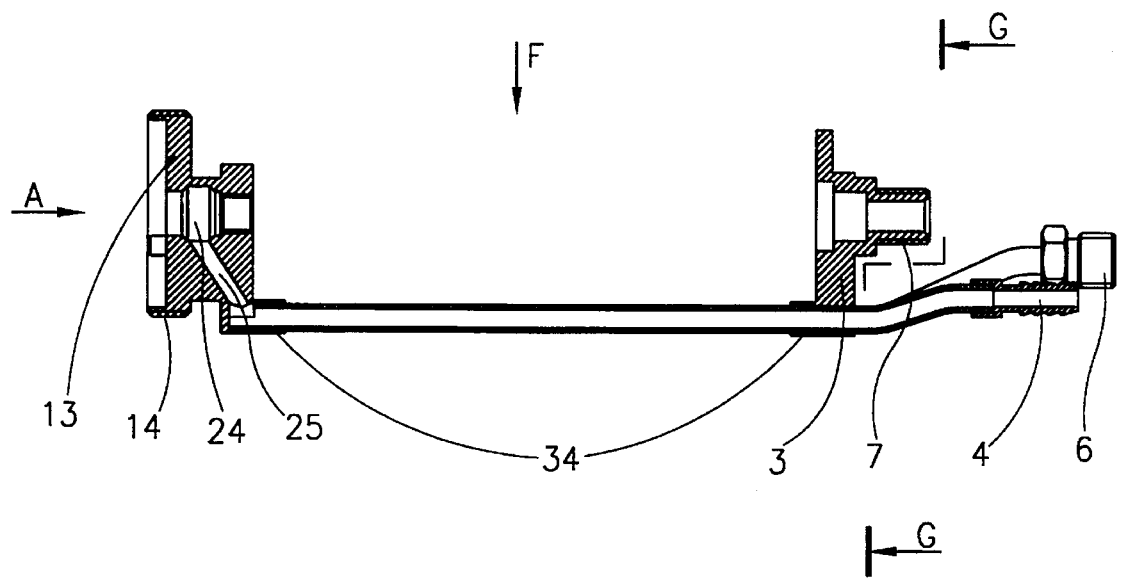
FIG. 9 is cross section of front/back assembly for water-cooled.
Figure 10:
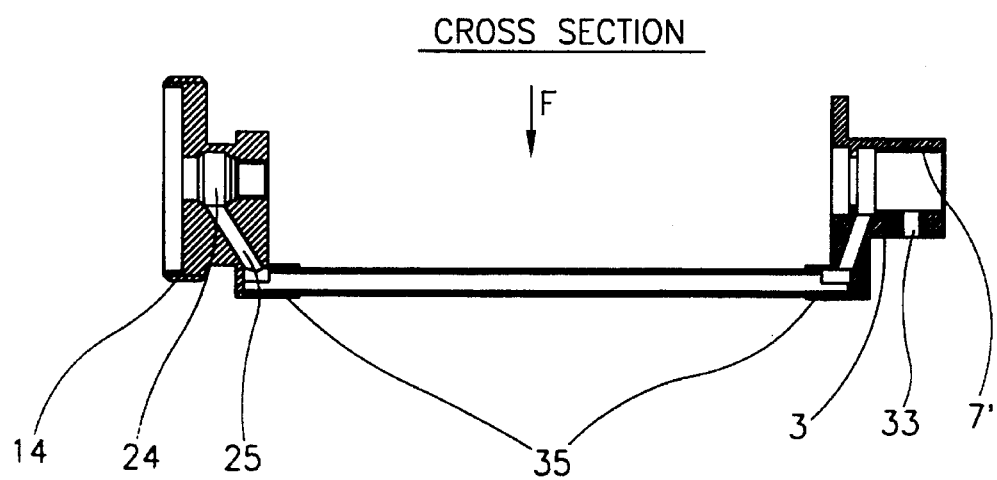
FIG. 10 is a cross section of front/back assembly for gas-cooled.
Figure 11:
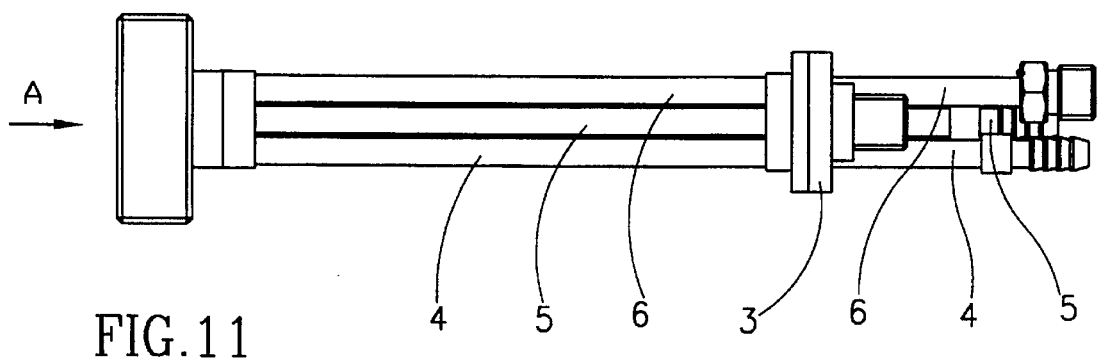
FIG. 11 is view F of FIGS. 9 and 10.
Figure 12:
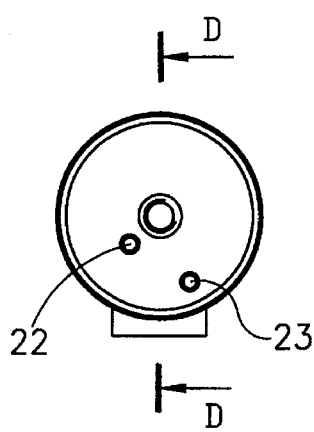
FIG. 12 is a view A of FIGS. 9 and 10.
Figure 13:
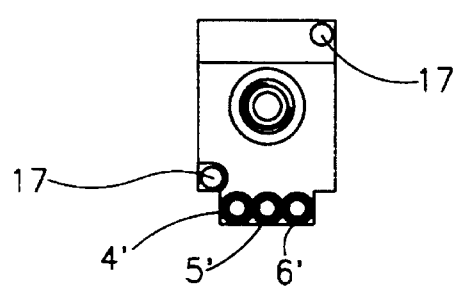
FIG. 13 is a back view of FIGS. 9 and 10.

A more detailed explanation of the feeder torch, according to FIGS. 1–13 is as follows:

The planetary head-1 is connected to the motor-2 with hollow shaft-16. The motor-2 is based in the back holder-3 with screws-17. The back holder-3 has distributor holes-4, 5,6 for transmission of water and gas. The wire guiding tube-18 with the conduit-9 is assembled to the back holder-3 with nut-7. The gas tube-19 from the conduit-9 is assembled with the gas tube-5 with a nut, and the welding cable-21 with the tube-6 and water outlet with the tube-4. The front holder-13 is assembled with brazing with the tubes-4,5,6. This holder-13 has distributor hole-25 for gas and distributor holes-23,23 for water. The gas is connected to the neck-15 with diffuser-24. Also, the water is connected to the neck-15 with the distributor holes 22,23. The welding current is transmitted from the welding cable-21 to the front holder-13 and the neck-15 with tubes-4,5,6. The neck-15 is assembled with the front holder with thread and nut-14 for welding current transmission. Between the neck body-26 and the front holder-13 is sealing with rubber seal-27. The same seal-27 is for water-and gas-insulation. All of these parts are included in the handle-12 and 12' (12 is the right and 12' is the left part of the handle). In addition, in the handle-12 and 12' is mounted switch-11 and two potentiometers-28,29 for wire speed and arc voltage control. For fixing to the welding table, the handle has hook-30. The wire-32 from the conduit-9(10) is push-pulled with the planetary head-1 to the guide-31 and to the neck-15.

In the gas-cooled version of the torch feeder, the tubes-4,6 are prepared like rods 4',6' instead of increasing the cross section of the welding transmission body, and the nut-7 is male screw 7' with fixator-33.

While the invention has been described with respect to a limited number of embodiments, it will be appreciated that many variations, modifications and other applications of the invention may be made.

What is claimed is:

1. A torch wire feeder for arc welding featuring a body and provided a welding current, welding wire, water for cooling parts of the torch wire feeder, gas for fueling the torch and shielding the welding arc, the torch wire feeder comprising:

(a) a front holder and a back holder at the two remote ends of said body;

(b) an electric motor situated between said front holder and said back holder, affixed to said back holder;

(c) a planetary wire feeder situated between said front holder and said back holder and affixed to said motor;

(d) a plurality of tubes traversing from said front holder to said back holder, said tubes embodying a conduit for welding current, two conduits for water and a conduit for gas, said tubes are situated around said motor and said planetary head;

(e) a goose neck featuring a neck body made up of two cylindrical chambers for transmitting water into and out of said goose neck, said goose neck being connected to said front holder by a thread nut, said thread nut serving to transmit welding current, said goose neck affording 360° rotation, said goose neck being removable from said front holder; the torch wire feeder being ergonomic.

2. The torch wire feeder of claim 1, wherein certain of said robes are replaced with rods embodying a conduit for wire feeding and a conduit for welding current.

3. The torch wire feeder of claim 1, wherein said front holder and said thread nut accommodate alternately a goose neck for water cooled operation and a goose neck for air cooled operation.

4. The torch wire feeder of claim 1, further comprising a handle featuring two potentiometers: one for controlling wire speed and one for controlling arc voltage.

5. The torch wire feeder of claim 1, wherein said tubes embody:

(a) a wire conduit surrounded by a liner;

(b) a gas conduit around said liner;

(c) a coaxial cable for a welding current conduit.

6. The torch wire feeder of claim 1, further comprising:

(a) a male screw connected to the outside of said back holder for attaching a welding current conduit featuring a reciprocal female screw thereto;

(b) an affixing nut for fastening around said reciprocal female screw.

7. The torch wire feeder of claim 1, further comprising distributor holes in said front holder for connecting said tubes to said goose neck body.

8. The torch wire feeder of claim 7, wherein one of said distributor holes features a diffuser for diffusing gas into said goose neck body.

9. The torch wire feeder of claim 8, further comprising a diffuser and guide for receiving wire from said planetary wire feeder and guiding said wire to said goose neck, said diffuser and guide is removable and is exchangeable for diffusers and guides of varying thickness.

10. The torch wire feeder of claim 7, wherein two of said distributor holes are respectively connected to each of said cylindrical chambers of said goose neck body.

11. The torch wire feeder of claim 1, wherein said thread nut transmits welding current from said welding cable conduit to said goose neck.

* * * * *